| GANG | $B_R$ | $B_{80}$ | $B_{100}$ | $K_{70}$ | $K_{100}$ | $F_3$ |
|---|---|---|---|---|---|---|
| 1 | | | O | | O | O |
| 2 | | O | O | | | |
| 3 | | | O | O | | |
| 4 | | | | O | O | |
| R | O | | | | O | O |

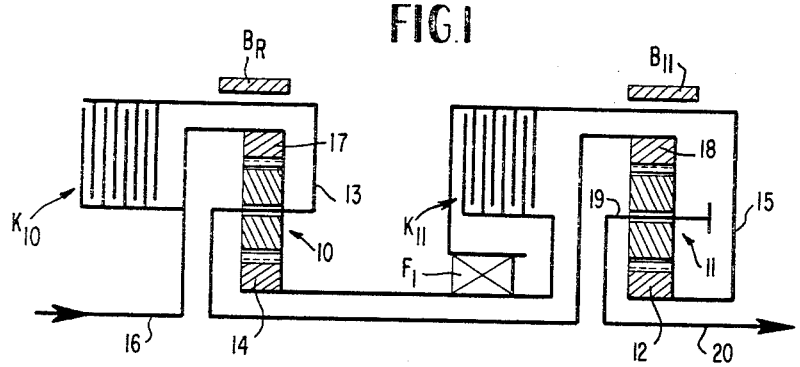
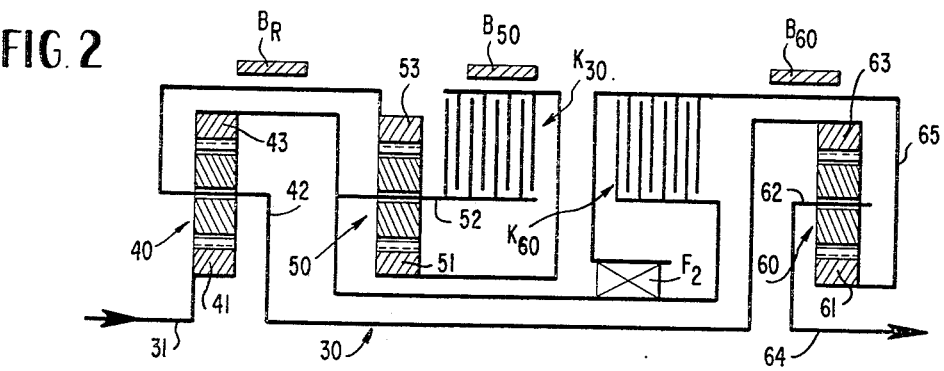

INVENTORS
HANS-JOACHIM M. FÖRSTER
WOLFGANG ZAISER

BY  *Dickert Craig*

ATTORNEYS

United States Patent Office 3,483,771
Patented Dec. 16, 1969

3,483,771
MOTOR VEHICLE CHANGE SPEED
TRANSMISSION
Hans-Joachim M. Förster, Stuttgart-Riedenberg, and Wolfgang Zaiser, Althutte, Wurttemberg, Germany, assignors to Daimler-Benz Aktiengesellschaft, Stuttgart-Unterturkheim, Germany
Filed June 10, 1966, Ser. No. 556,610
Claims priority, application Germany, June 12, 1965,
D 47,498
Int. Cl. F16h 57/10
U.S. Cl. 74—759                49 Claims

ABSTRACT OF THE DISCLOSURE

A motor vehicle change-speed gear in which the input member of an output planetary gear group is directly connected with a member of an input planetary gear group while the reaction member of the output planetary gear group is operatively connected with another member of the input planetary gear group by way of a free-wheeling clutch, and in which clutches and brakes are provided for engaging the various transmission ratios whereby one clutch and one brake are operatively associated with the output planetary gear group and act on the connection from the free-wheeling clutch to the reaction member.

---

The present invention relates to a motor vehicle change-speed transmission in which the input member of an output planetary-gear group is coupled directly with a member of an input planetary-gear group and in which the reaction member of the output planetary-gear group is coupled with a member of the input planetary-gear group by way of a free-wheeling clutch and in which clutches and brakes for the planetary gear groups are provided for purposes of shifting the transmission ratios, i.e., engaging the speeds thereof.

The aim and object underlying the present invention resides in reducing the structural expenditures of such a change-speed gear in an advantageous manner with a simultaneous reduction of the number of shifting means and avoidance of a "group-change" during shifting of the speed reductions or transmission ratios. By the term "group-change" in connection with the shifting operation is to be understood herein that during shifting from an effective existing speed or transmission ratio into a new speed or transmission ratio, all of the shifting means in operative engagement during the pre-existing speed or transmission ratio are rendered inoperative and other shifting means are rendered effective or operative for the new speed or transmission ratio to be engaged.

A known three-speed, change-speed transmission of the aforementioned type is provided with two planetary-gear groups of which each consists of one planetary gear. For purposes of engaging the forward speeds and the reverse speed thereof, three brakes, two free-wheeling clutches, one shifting clutch for the input planetary-gear group as well as a bridging clutch for bridging both planetary-gear groups are necessary with this prior art change-speed transmission. In addition to this relatively large number of shifting means, three concentric hollow shafts are necessary in this transmission for the torque transmission so that not only the structural expenditures thereof are high but also the pressure-medium supply to the shifting means is complicated. For purposes of accommodating the shifting and transmission members, at least ten radial web-walls are necessary in this prior art change-speed transmission whereby the structural length of this transmission is disadvantageously large.

The operation of this known three-speed change-speed transmission is particularly disadvantageous in that no pushing moments of the vehicle can be transmitted to the driving engine in the reverse speed thereof and only slight pushing moments of the vehicle can be transmitted to the driving engine in the second speed thereof.

The aforementioned disadvantages are avoided by the present invention with a change-speed transmission of the aforementioned type in that one clutch and one brake each for the output planetary-gear group are operatively associated and effective on the transmission connection from the free-wheeling clutch to the reaction member thereof. The advantage is achieved by the present invention compared to the known transmission that, on the one hand, for purposes of shifting and engaging three forward speeds and one reverse speed only one brake and one clutch for each planetary-gear group are necessary in addition to the free-wheeling clutch. Additionally, for purposes of the force or torque transmission, only two concentric shafts are still needed and only eight radial web walls still have to be provided in an advantageous manner for the accommodation of the shifting and transmission members.

According to a further feature of the present invention, the free-wheeling clutch is adapted to be bridged in a manner, known per se, by a clutch of the output planetary-gear group. As a result thereof, pushing moments of the vehicle can be transmitted in all speeds by way of the transmission to the driving engine for purposes of achieving a braking effect in the transmission according to the present invention. A higher brake effect is attainable in second speed by the present invention as compared to the known three-speed transmission since the reaction member of the latter cannot be braked in second speed for the pushing moments. By means of the arangement of the clutch according to the present invention parallel to the free-wheeling device, the latter may also be saved in an advantageous manner.

The aforementioned advantages of the present invention together with the shifting without "group-change" to be described more fully hereinafter are also achieved with a four-speed, change-speed transmission if, according to a further feature of the present invention, the input planetary-gear group is constituted by a first and by a second single-web planetary gear with double mutual connection or reciprocal coupling, i.e., by two mutually and dually coupled planetary gears having only a single planet carrier and if a coupling section connected with the planetary-gear carrier of the first planetary gear is connected with a member of the second planetary gear as well as with the input member of the output planetary-gear group. For such a transmission arrangement, only two clutches and three brakes are necessary in addition to the free-wheeling device for purposes of shifting or engaging, without "group-change," four forward speeds and a reverse speed. Pushing moments of the vehicle can be transmitted also in this case by way of the transmission to the driving engine. A further advantage of the present invention results from the fact that the transmission ratio conditions of all geared-down or geared-up speeds can be changed exclusively with the change of the transmission ratio of the output planetary-gear group.

Planetary-gear groups consisting of two planetary gears provided with double-mutual coupling in which a free member or a coupling section form the input or output, are known per se in the prior art and do not, by themselves, form the subject of the present invention.

With an advantageous construction for a four-speed, change-speed transmission having the features of the present invention, the occurrence of a disadvantageous idle power in the input planetary-gear group is avoided according to a further feature and development of the present invention in that the non-coupled member in the second planetary gear of the input planetary-gear group is operatively connected by way of the free-wheeling clutch with the reaction member of the output planetary-gear group.

In order to reduce, in an advantageous manner, the dynamic loads of the transmission resulting from centrifugal forces in the rotating pressure medium, according to a further feature of the present invention, the clutch for the direct transmission in the input planetary-gear group may be arranged in the torque flow or power path between two members of the secondary planetary gear. In this planetary gear the members of the clutch conducting the pressure medium and those acted upon by the pressure medium rotate with a rotational speed geared down with respect to the input rotational speed so that the effective centrifugal forces are smaller and therewith less harmful.

Accordingly, it is an object of the present invention to provide a change-speed transmission of the type described above which avoids by simple means, the aforementioned disadvantages and shortcomings encountered with the prior art constructions.

It is another object of the present invention to provide a motor vehicle change-speed transmission which permits a reduction in the number of shifting means while avoiding at the same time during shifting of the speeds a "group-change" involving a disengagement of all previously engaged engageable shifting means and for the realization of the new speed, an engagement of engageable shifting means not previously engaged in the pre-existing transmission ratio.

A further object of the present invention resides in a change-speed transmission for motor vehicles which not only permits a simplified construction, particularly by minimizing the number of engageable means, but in which also the number of concentric hollow shafts is kept at a minimum in order to make the supply of pressure medium to the shifting means as uncomplicated as possible.

Still another object of the present invention resides in a change-speed transmission of the type described above which not only achieves all of the aforementioned objects and advantages but which also excels by a reduced structural length in comparison with similar change-speed transmission entailing the same operational advantages.

A still further object of the present invention resides in a change-speed transmission of the type described in which pushing moments of the vehicle, i.e., moments resulting from a pushing vehicle, can be transmitted in all speeds by way of the transmission to the driving engine for purposes of achieving a braking effect.

A further object of the present invention resides in a change-speed transmission in which the use of a parallel clutch permits the saving of a free-wheeling device.

Still another object of th present invention resides in a change-speed transmission for motor vehicles in which the effective centrifugal forces acting on the pressure medium are smaller and less harmful than those in the pre-existing prior art transmissions.

These and further objects, features, and advantages of the present invention will become more obvious from the following description when taken in connection with the accompanying drawing which shows, for purposes of illustration only, several embodiments in accordance with the present invention, and wherein:

FIGURE 1 is a schematic illustration of a three-speed, transmission in accordance with the present invention;

FIGURE 1a is a diagrammatic shifting chart, illustrating the pattern of engagement and disengagement of the various shifting members in the different individual speeds of the transmission of FIGURE 1;

FIGURE 2 is a schematic of a four-speed, change-speed transmission in accordance with the present invention;

FIGURE 2a is a diagrammatic shifting chart, indicating the pattern of engagement and disengagement of the various members in the different speeds of the transmission of FIGURE 2;

Figures 3, 3A:
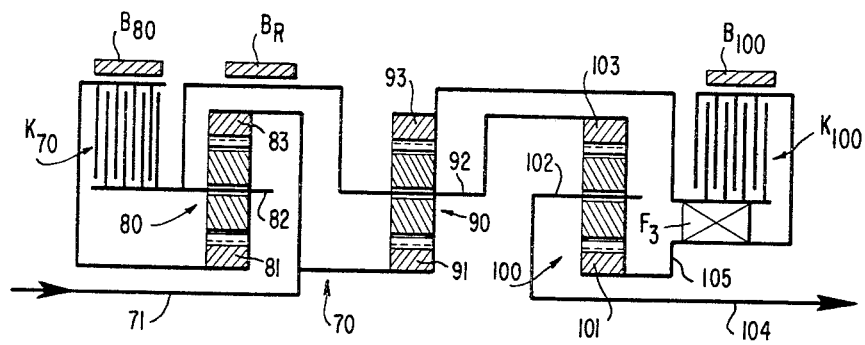
FIGURE 3 is a schematic illustration of a further embodiment of a four-speed, change-speed transmission according to the present invention.
FIGURE 3a is a diagrammatic shifting chart, again indicating the pattern of engagement and disengagement of the various shifting members in the different speeds of the transmission of FIGURE 3.

Referring now to the drawing, wherein like reference characters are used throughout the various views to designate like parts, the three-speed, change-speed transmission according to FIGURE 1 consists of an input planetary-gear group generally designated by reference numeral 10 and of an output planetary-gear group generally designated by reference numeral 11. Each planetary gear group consists of a single-web planetary gear, i.e., a planetary gear with only one planet carrier whereby the sun gear 12 of the output planetary-gear group 11 is operatively connected as reaction member, by way of a conventional free-wheeling clutch $F_1$ with sun gear 14 of the input planetary-gear group 10. The free-wheeling clutch $F_1$ blocks or prevents the backward rotation of the sun gear 14 as related to the normal direction of rotation of the input shaft 16 of the change-speed gear with respect to the transmission coupling section 15 extending from the free-wheeling clutch $F_1$ to the sun gear 12. The input shaft 16 is connected with the hollow ring gear 17 of the input planetary-gear group 10 and may be coupled to the planetary-gear carrier 13 of this group by way of a shifting clutch generally designated by reference character $K_{10}$. The planetary-gear carrier 13 is adapted to be braked by means of a brake $B_R$ and is connected with the hollow ring gear 18 of the output planetary-gear group 11. The transmission connection or coupling section 15 extending from the one-way clutch $F_1$ to the sun gear 12 of the output planetary-gear group 11, is adapted to be braked by a brake $B_{11}$ whereas the planetary-gear carrier 19 of this gear group is connected with the output shaft 20. The sun gear 12 of the output planetary-gear group 11 is adapted to be coupled with the sun gear 14 of the input planetary gear group 10 in both directions of rotation by means of a shifting clutch generally designated by reference character $K_{11}$ which is arranged in parallel to the free-wheeling clutch $F_1$.

FIGURE 1a illustrates how the transmission ratios of the individual speeds are engaged. In first speed, only the brake $B_{11}$ is actuated, i.e., the transmission connection or coupling section 15 together with the sun gear 12 of the output planetary-gear group 11 is braked or held stationary. The sun gear 14 as the reaction member of the input planetary-gear group 10 is supported by way of the free-wheeling or one-way clutch $F_1$ at the braked stationary transmission connection or coupling section 15.

During shifting from first to second speed no "group-change" takes place, i.e., the brake $B_{11}$ continues to remain engaged, for example, by means of a pressure medium in any conventional manner. In addition to the brake $B_{11}$, the clutch $K_{10}$ is now engaged in the second speed, for example, again by means of a pressure medium. The planetary gear 10 then rotates as a unit and only the output planetary gear 11 produces a speed reduction.

Also, the shifting from second to third speed takes place without "group-change," i.e., one of the shifting members of the second speed; namely, the clutch $K_{10}$, remains engaged also in the third speed. During this shifting operation, the brake $B_{11}$ for the first and second speeds is disengaged and the shifting clutch $K_{11}$ is actuated or engaged. As a result thereof, both planetary gears 10 and 11 rotate as a unit and the input shaft 16 as well as the output shaft 10 rotate with the sae rotational speed.

In reverse speed, only the brake $B_R$ is operative, i.e., the planetary gear carrier 13 of the input planetary-gear group 10 and the hollow ring gear 18 of the output planetary-gear group 11 are braked and thus held stationary. The sun gear 14 of the input planetary-gear group 10 which rotates in the backward direction with respect to the input shaft 16 is connected by way of the free-wheel device $F_1$ with the sun gear 12 of the output planetary-gear group 11 so that the output shaft 20 rotates in the opposite direction of rotation with respect to the input shaft 16.

With this three-speed transmission, pushing moments of the vehicle can be absorbed without difficulty by the input torque of the shaft 16 in both the second speed and in the third speed since the free-wheeling clutch $F_1$ is ineffectual in these speeds; in other words, with the vehicle pushing the engine, a braking effect can be achieved by the driving torque.

Since the shifting clutch $K_{11}$ is arranged in the power path parallel to the free-wheeling clutch $F_1$, the aforementioned braking effect can be achieved also in first speed and in reverse speed with a pushing vehicle by actuation of this shifting clutch $K_{11}$.

The four-speed, change-speed transmission schematically illustrated in FIG. 2 again comprises an input planetary gear group generally designated by reference numeral 30 and an output planetary gear group generally designated by reference numeral 60. The input planetary-gear group 30 consists of a first and of a second single-web planetary gear, i.e., having only one planet carrier and generally designated by reference numerals 40 and 50, respectively, which are provided with mutual, double coupling connections whereby the sun gear 41 of the first planetary gear 40 is connected with the input shaft 31 of the four-speed transmission. The planetary-gear carrier 42 of the first planetary gear 40 is connected, on the one hand, with the hollow ring gear 53 of the second planetary gear 50 and, on the other, with the hollow ring gear 63 as input member of the output planetary gear group 60.

The hollow ring gear 43 of the first planetary gear 40 is connected, on the one hand, with the planetary gear carrier 52 of the second planetary gear 50 and may be in operative connection, on the other, by way of either a free-wheeling or one-way clutch $F_2$ or a shifting clutch generally designated by reference character $K_{60}$ with the sun gear 61 as the reaction member of the output planetary-gear group 60.

The planetary-gear carrier 42 of the first planetary gear 40 and the sun gear 51 of the second planetary gear 50 are each adapted to be braked or held stationary by means of a respective brake $B_R$ and $B_{50}$. A shifting clutch generally designated by reference character $K_{30}$ is provided in the power path between the planetary gear carrier 52 and the sun gear 51 of the second planetary gear 50. The planetary gear carrier 62 of the output planetary gear group 60 is connected with the output shaft 64 of the four-speed, change-speed transmission. The force-transmission connection or coupling section from sun gear 61 to the free-wheeling clutch $F_2$ is designated by reference numeral 65.

The chart of FIGURE 2a again illustrates the shifting members which are effective in the individual speeds.

In the first speed, again only one brake, in this case, brake $B_{60}$ is actuated or engaged. As a result thereof, the sun gear 61 and the force-transmitting connection or coupling section 65 of the output planetary gear group 60 are braked and thus held stationary. The hollow ring gear 43 of the first planetary gear 40 of the input planetary gear group 30 is supported at the braked or stationary transmission connection or coupling section 65 by way of the free-wheeling clutch $F_2$. The free-wheeling or one-way clutch $F_2$ prevents a backward rotation of the hollow ring gear 43 with respect to the sun gear 61 in relation to the normal direction of rotation of the input shaft 31.

The shifting from first to second speed again takes place without "group-change" since the brake $B_{60}$ remains effective, i.e., remains engaged. In addition to the brake $B_{60}$, the brake $B_{50}$ is engaged or actuated in second speed. The free-wheeling clutch $F_2$ becomes inoperative or ineffectual since the hollow ring gear 43 now rotates in the same direction of rotation as the input shaft 31.

Also the shifting from second to third speed is possible without "group-change" since the brake $B_{60}$ continues to remain engaged. The brake $B_{50}$ for the second speed is disengaged and in lieu thereof, the shifting clutch $K_{30}$ is rendered operative or actuated. As a result thereof, the input planetary-gear group 30 rotates as a unit.

In direct or fourth speed, the shifting clutch $K_{30}$ remains engaged and in the place of the brake $B_{60}$ the clutch $K_{60}$ is now actuated or engaged. Also, during this shifting operation, no "group-change" takes place therefor.

In reverse speed, only the brake $B_R$ is actuated. As a result thereof, the planetary gear carrier 42 and hollow ring gear 63 are braked and held stationary. The hollow ring gear 43 which now rotates in the backward direction with respect to the input shaft 31 is coupled by way of the free-wheeling clutch $F_2$ with the sun gear 61 so that the output shaft 64 is driven in the backward direction of rotation.

Also with this four-speed, change-speed transmission, the free-wheeling clutch $F_2$ is effective only in the first and reverse speed so that by actuation of the shifting clutch $K_{60}$ effective as bridging means of the free-wheeling $F_2$, i.e., effective to by-pass the free-wheeling clutch $F_2$ by its parallel connection therewith, a braking effect is achieved with a pushing vehicle.

This four-speed transmission excels by a relatively short structural length. Compared to a known four-speed transmission with only two planetary gears but with three required shifting clutches, no increase in constructional length results with the transmission according to the present invention whereas with the transmission according to the present invention, the advantages of shifting without "group-changes" as well as the possibility of braking with a pushing vehicle in all speeds are available.

A further, advantageous construction of a four-speed, change-speed transmission having the features of the present invention is schematically illustrated in FIG. 3.

The transmission again consists of an input planetary-gear group generally designated by reference numeral 70 and of an output planetary-gear group generally designated by reference numeral 100. The input planetary-gear group 70 consists of a first and of a second single-web or single planet carrier planetary gear generally designated by reference numerals 80 and 90, respectively. The planetary gear carrier 82 of the first planetary gear 80 is connected, one the one hand, with the planetary gear carrier 92 of the second planetary gear 90, and on the other, with the hollow ring gear 103 as input member of the output planetary-gear group 100.

The essential difference of this transmission compared to the transmission of FIG. 2 resides in the fact that the non-coupled member of the second planetary gear, i.e., that member of the second planetary gear not mutually coupled to a member of the first planetary gear (in this case the hollow ring gear 93), is operatively connected by way of the free-wheeling clutch $F_3$ with the sun gear 101 as reaction member of the output planetary-gear group 100.

The transmission connection or coupling section from sun gear 101 to free-wheeling clutch $F_3$ is designated by reference numeral 105 and the output shaft of the transmission by refence numeral 104. A shifting clutch generally designated by reference character $K_{100}$ is arranged in the power path in parallel to the free-wheeling clutch $F_2$. The planetary gear carrier 102 of the output planetary-gear group 100 is connected with the output shaft 104.

The sun gear 81 and the planetary gear carrier 82 of the first planetary gear 80 as well as the sun gear 101 of the output planetary-gear group 100 are each adapted to be braked by a brake $B_{80}$, $B_R$, and $B_{100}$, respectively. A shifting clutch generally designated by reference character $K_{70}$ is provided in the power path between the sun gear 81 and the planetary gear carrier 82. The input shaft 71 of the change-speed gear is connected, on the one hand, with the hollow ring gear 83 of the first planetary gear 80 and on the other, with the sun gear 91 of the second planetary gear 90.

FIGURE 3a again illustrates the shifting pattern for the shifting members of the transmission illustrated in FIG. 3 without "group-changes" and with the braking possibility in all speeds. The particular advantage of this transmission resides in the fact that by means of the connection of the non-coupled member 93 of the second planetary gear 90 in the input planetary-gear group 70 with the reaction member 101 of the output planetary gear group 100 by way of the free-wheeling clutch $F_3$, no disadvantageous idle power can occur in the input planetary gear group 70 in any of the speeds.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A motor vehicle change-speed transmission comprising input means, output means, means operatively connecting said input means with said output means including an input planetary gear group and an output planetary gear group, each planetary gear group having at least one planetary gear set provided with a plurality of rotary members and including at least one planet gear in meshing engagement with two annular gears and a planetary gear carrier for said planet gear, one member of the planetary gear set of the output planetary gear group constituting the input member thereof, first means directly connecting the input member of the output planetary gear group with one member of the input planetary gear group, another member of the output planetary gear group constituting a reaction member thereof, second means operatively connecting said reaction member with another member of the input planetary gear group including one-way means between said reaction member and said another member of the input planetary gear group, and means for engaging the various speeds of said transmission including engageable means constituting clutches and brakes, one brake and one clutch being operatively connected directly with the output planetary gear group to operate in both directions of rotation, and another engageable means constituting a brake being opearble to hold fast said first connecting means to produce a reverse speed with speed reduction, said one-way means being series-connected in said second means.

2. A transmission providing four forward speeds and a reverse speed according to claim 1, wherein the input planetary gear group consists of a first and of a second planetary gear sets and double mutual connecting means between different members of said first and second planetary gear sets, with the planetary gear carrier of the first planetary gear sets of the input planetary gear group being operatively connected with a member of the second planetary gear set of the input planetary gear group as well as with the input member of the output planetary gear group.

3. A transmission according to claim 2, wherein the member of the second planetary gear set of the input planetary gear group devoid of a connection with a member of the first planetary gear set of the input planetary gear group by said double mutual connecting means, is operatively connected with the reaction member of the output planetary gear group.

4. A transmission according to claim 3, wherein a clutch produces a direct transmission in the input planetary gear group and is arranged in the power path between two members of the first planetary gear set.

5. A transmission according to claim 2, wherein a clutch produces a direct transmission in the input planetary gear group and is arranged in the power path between two members of the second planetary gear set.

6. A motor vehicle change-speed transmission comprising input means adapted to be connected to an engine, output means, means operatively connecting said input means with said output means including an input planetary gear group and an output planetary gear group to provide at least three forward speeds and a reverse speed, each planetary gear group having at least one planetary gear set provided with a plurality of rotary members and including at least one planet gear in meshing engagement with two annular gears and a planetary gear carrier for said planet gears, one member of the planetary gear set of the output planetary gear group constituting the input member thereof, first means directly connecting the input member of the output planetary gear group with one member of the input planetary gear group, another member of the output planetary gear group constituting a reaction member thereof, second means including one-way clutch means operatively connecting said reaction member with another member of the input planetary gear group; and means for engaging the various speeds of said transmission consisting of at least three forward speeds and a reverse speed including engageable means constituting clutches and brakes and means including one brake and one clutch of said engageable means operable on the reaction member of the output planetary group to enable braking by the engine in at least the second forward speed.

7. A transmission according to claim 6, wherein the one-way clutch means is adapted to be bridged by the one clutch of the output planetary gear group operatively connected in parallel therewith.

8. A transmission providing four forward speeds and a reverse speed according to claim 7, wherein the input planetary gear group consists of a first and of a second planetary gear set, and double mutual connecting means between different members of said first and second planetary gear sets, with the planetary gear carrier of the first planetary gear set of the input planetary gear group being operatively connected with a member of the second planetary gear set of the input planetary gear group as well as with the input member of the output planetary gear group.

9. A transmission according to claim 8, wherein the member of the second planetary gear set of the input planetary gear group devoid of a connection with a member of the first planetary gear set of the input planetary gear group by said double mutual connecting means is opeatively connected by way of said free-wheeling clutch means with the reaction member of the output planetary gear group.

10. A transmission according to claim 8, wherein one of said clutches produces a direct transmission in the input planetary gear group and is arranged in the power path between two members of the second planetary gear set.

11. A motor vehicle change-speed transmission comprising input means, output means, an input planetary gear group and an output planetary gear group, each planetary gear group having at least one planetary gear set provided with a plurality of members and including at least one planet gear in meshing engagement with two annular gears consisting of ring and sun gears and a planetary gear carrier for said planet gear, one annular gear of the output planetary gear group constituting the input member thereof, first means directly connecting the input member of the output planetary gear group with a planetary gear carrier of the input planetary gear group, the other annular member of the output planetary gear group constituting a reaction member thereof, second means including one-way means operatively connecting said reaction member with an annular member of the input planetary gear group, and means for engaging at least three forward speeds and one reverse speed of said transmission including engageable means constituting clutches and brakes, at least one brake and one clutch being operatively coordinated directly to the reaction member of the output planetary gear group, said one brake being operable to hold fast the reaction member of the ouput planetary gear group.

12. A transmission according to claim 11, wherein said input planetary gear group includes two such planetary gear sets to produce four forward speeds and one reverse speed.

13. A transmission according to claim 1, wherein the output planetary gear set has only a single planet carrier supporting at least one planet gear meshing with only two annular gears.

14. A motor vehicle change-speed transmission providing at least three forward speeds and a reverse speed, comprising input means, output means, an input planetary gear group and an output planetary gear group operatively connected between said input and output means, each planetary gear group having at least one planetary gear set provided with a plurality of rotatable members and including at least one planet gear in meshing engagement with two annular gears and a planetary gear carrier for said planet gear, one member of the planetary gear set of the output planetary gear group constituting the input member thereof, another member of the output planetary gear group constituting a reaction member thereof, the output means being operatively connected with a further member of the output planetary gear group, one member of the input planetary gear group being adapted to be operatively connected with the input member of the output planetary gear group, another member of the input planetary gear group being adapted to be connected with the reaction member of the output planetary gear group, and said input means being operatively connected in all speeds with a further member of the input planetary gear group, and further means for selectively engaging said speeds including a plurality of connecting means operatively connecting respective members of the input and output planetary gear group and a plurality of engageable means operatively coordinated to said connecting means and to said rotatable members in such a manner that at least one previously engaged engageable means of the pre-existing speed remains engaged when shifting up to the next higher speed requiring the engagement of a further engageable means, one of said connecting means operatively connecting said reaction member of the output planetary gear group with said another member of the input planetary gear group and including one-way clutch means in parallel with one engageable means.

15. A transmission according to claim 14, which is capable of providing four forward speeds and one reverse speed, and wherein said input planetary gear group consists of two planetary gear sets having each two members thereof mutually interconnected.

16. A motor vehicle change-speed transmission comprising input means, output means, means operatively connecting said input means with said output means including an input planetary gear group and an output planetary gear group, each planetary gear group having at least one planetary gear set provided with a plurality of rotary members and including at least one planet gear in meshing engagement with two annular gears and a planetary gear carrier for said planet gear, one member of the planetary gear set of the output planetary gear group constituting the input member thereof, first means directly connecting the input member of the output planetary gear group with one member of the input planetary gear group, another member of the output planetary gear group constituting a reaction member thereof, second means including one-way clutch means operatively connecting said reaction member with another member of the input planetary gear group, and means for engaging the various speeds of said transmission including engageable means constituting clutches and brakes, one brake and one clutch being operatively connected with the output planetary gear group and said one brake acting directly on said reaction member to enable selective braking in both directions of rotation while said one clutch is operable, upon engagement thereof, to provide a direct driving connection between said reaction member and another member of the input planetary gear group.

17. A change-speed transmission according to claim 16, wherein one of said engageable means is operable to bridge said one-way clutch means.

18. A change-speed transmission according to claim 17, wherein one of said engageable means is operatively associated with said first connecting means to brake the same for producing a reverse speed with a speed reduction.

19. A change-speed transmission according to claim 16, wherein one of said engageable means is operatively associated with said first connecting means to brake the same for producing a reverse speed with a speed reduction.

20. A motor vehicle change-speed transmission, comprising input means, output means, means operatively connecting said input means with said output means including an input planetary gear group and an output planetary gear group to provide four forward speeds and a reverse speed, the input planetary gear group having two planetary gear sets and the output planetary gear set group one planetary gear set, each planetary gear set being provided with a plurality of mutually exclusive rotary members and each including at least one planet gear in meshing engagement with two annular gears and a planetary gear carrier for said planet gear, one member of the planetary gear set of the output planetary gear group constituting the input member thereof, first means directly connecting the input member of the output planetary gear group with one member of one of the two planetary gears of the input planetary gear group, another member of the output planetary gear group constituting a reaction member thereof, second means operatively connecting said reaction member with another member of the one planetary gear set of the input planetary gear group, and means for engaging the various speeds of said transmission including two operative connections each between two different rotary members of the two planetary gear sets of the input planetary gear group and engageable means constituting clutches and brakes, one brake and one clutch being operatively connected with the reaction member of the output planetary gear group.

21. A motor vehicle change-speed transmission, comprising input means, output means, means operatively connecting said input means with said output means including an input planetary gear group and an output planetary gear group to provide four forward speeds and a reverse speed, the input planetary gear group having two planetary gear sets and the output planetary gear set group only one planetary gear set, each planetary gear set being provided with a plurality of mutually exclusive rotary members and each including at least one planet gear in meshing engagement with two annular gears and a planetary gear carrier for said planet gear, one member of the planetary gear set of the output planetary gear group constituting the input member thereof, first means directly connecting the input member of the output planetary gear group with one member of one of the two planetary gear sets of the input planetary gear group, another member of the output planetary gear group constituting a reaction member thereof, second means including one-way clutch means operatively connecting 3,483,771

11 said reaction member with another member of the one planetary gear set of the input planetary gear group, and means for engaging the various speeds of said transmission including two operative connections each between two different rotary members of the two planetary gear sets of the input planetary gear group and engageable means constituting clutches and brakes, one brake and one clutch being operatively connected with the reaction member of the output planetary gear group.

22. A change-speed transmission according to claim 21, wherein said one clutch effectively bridges said one-way clutch means.

23. A change-speed transmission according to claim 20, wherein three rotary members of said input planetary gear group are adapted to be selectively braked as reaction members by corresponding engageable means.

24. A motor vehicle change-speed transmission comprising input means, output means, an input planetary gear group and an output planetary gear group, the input planetary gear group having two planetary gear sets and the output planetary gear set group having one planetary gear set, each planetary gear set being provided with a plurality of members and including at least one planet gear in meshing engagement with two annular gears consisting of ring and sun gears and a planetary gear carrier for said planet gear, one annular gear of the output planetary gear group constituting the input member thereof, first means directly connecting the input member of the output planetary gear group with a planetary gear carrier of the input planetary gear group, the other annular member of the output planetary gear group constituting a reaction member thereof, second means operatively connecting said reaction member with an annular member of the input planetary gear group, and means for engaging four forward speeds and one reverse speed of said transmission including further connecting means providing two connections each between two different members of the two planetary gear sets of the input planetary gear group and engageable means constituting clutches and brakes, at least one brake and one clutch being operatively coordinated to the reaction member of the output planetary gear group.

25. A change-speed transmission according to claim 24, further comprising one-way clutch means in the second connecting means.

26. A change-speed transmission according to claim 25, wherein an engageable means bridges said one-way clutch means.

27. A change-speed transmission according to claim 26, wherein the input member of the output planetary gear set is a ring gear set and the reaction member thereof a sun gear.

28. A change-speed transmission according to claim 27, wherein said first connecting means connects the ring gear of the output planetary gear group with the planetary gear set carrier of one of the two planetary gears of the input planetary gear group and said second connecting means connects the sun gear of the output planetary gear group with the ring gear of said one planetary gear set of the input planetary gear group.

29. A change-speed transmission according to claim 28, wherein the input means is operatively connected with only the sun gear of said one planetary gear set of the input planetary gear group.

30. A change-speed transmission according to claim 29, wherein said further means connects the planetary gear carrier of said one planetary gear set with the ring gear of the other planetary gear set of the input planetary gear group and the ring gear of the one planetary gear set with the planetary gear carrier of the other planetary gear set.

31. A change-speed transmission according to claim 30, wherein two of said engageable means are operatively associated with the sun gear of said other planetary gear set to brake the same or connect the same with another rotary

12 member of said other planetary gear set to lock up the latter.

32. A change-speed transmission according to claim 28, wherein said input means is operatively connected with the sun gear of the planetary gear set of the input planetary gear group.

33. A change-speed transmission according to claim 32, wherein said further means connects the planetary gear carrier of said one planetary gear set with the planetary gear carrier of the other planetary gear set of the input planetary gear group and the ring gear of said other planetary gear set with the sun gear of said one planetary gear set thereof.

34. A change-speed transmission according to claim 33, wherein two of said engageable means are operatively associated with the sun gear of said other planetary gear set to brake the same or connect the same with another rotary member of said other planetary gear set to lock up the latter.

35. A change-speed transmission according to claim 24, wherein three rotary members of said input planetary gear group are adapted to be braked as reaction members.

36. A change-over transmission according to claim 35, wherein said three rotary members are the planetary gear carrier and an annular member of one of the two planetary gear set of the input planetary gear group and an annular member of the other planetary gear set.

37. A change-speed transmission according to claim 29, wherein said input means is operatively connected with the sun gear of the planetary gear set of the input planetary gear group.

38. A change-speed transmission according to claim 37, wherein said further means connects the planetary gear carrier of said one planetary gear set with the ring gear of the other planetary gear set of the input planetary gear group and the ring gear of the one planetary gear set with the planetary gear carrier of the other planetary gear set.

39. A change-speed transmission to claim 38, wherein two of said engageable means are operatively associated with the sun gear of said other planetary gear set to brake the same or connect the same with another rotary member of said other planetary gear set to lock up the latter.

40. A change-speed transmission according to claim 37, wherein said further means connects the planetary gear carrier of said one planetary gear set with the planetary gear carrier of the other planetary gear set of the input planetary gear group and the ring gear of said other planetary gear set with the sun gear of said one planetary gear set thereof.

41. A change-speed transmission according to claim 40, wherein two of said engageable means are operatively associated with the sun gear of said other planetary gear set to brake the same or connect the same with another rotary member of said other planetary gear set to lock up the latter.

42. A motor vehicle change-speed transmission comprising input means, output means, an input planetary gear group and an output planetary gear group, each planetary gear group having only one planetary gear set provided with a plurality of rotary members and including at least one planet gear in meshing engagement with only two annular gears consisting of ring and sun gears and a planetary gear carrier for said planet gear, one annular gear of the output planetary gear group constituting the input member thereof, first means directly connecting the input member of the output planetary gear group with a planetary gear carrier of the input planetary gear group, the other annular member of the output planetary gear group constituting a reaction member thereof, second means operatively connecting said reaction member with an annular member of the input planetary gear group including a series-connected one-way clutch means, and means for engaging three forward speeds and one reverse speed of said transmission including engageable means constituting clutches and brakes, at least one brake and one clutch being operatively coordinated to the reaction member of the output planetary gear group to act directly on the section of the second means connecting said one-way clutch means with said reaction member in both directions of rotation and another brake being operatively coordinated to said first connecting means.

43. A change-speed transmission according to claim 42, wherein said one clutch is series-connected in said second means and effectively bridges said one-way clutch means.

44. A change-speed transmission according to claim 43, wherein the ring gear of the output planetary gear group is the input member thereof and the sun gear is the reaction member thereof.

45. A change-speed transmission according to claim 44, wherein said second means operatively connects the one of the two gears consisting of sun and ring gear of the input planetary gear group with the sun gear of the output planetary gear group.

46. A change-speed transmission according to claim 45, wherein one of said engageable means selectively connects the other one of said last-mentioned two gears of the input planetary gear group with the planetary gear carrier thereof.

47. A change-speed transmission according to claim 42, wherein the ring gear of the output planetary gear group is the input member thereof and the sun gear is the reaction member thereof.

48. A change-speed transmission according to claim 47, wherein said second means operatively connects the sun gear of the input planetary gear group with the sun gear of the output planetary gear group.

49. A change-speed transmission according to claim 48, wherein one of said engageable means selectively connects the sun gear of the input planetary gear group with the planetary gear carrier thereof.

References Cited

UNITED STATES PATENTS

| | | | |
|---|---|---|---|
| 2,827,805 | 3/1958 | Miller | 74—761 |
| 2,854,862 | 10/1958 | Foerster | 74—763 XR |
| 3,067,632 | 12/1962 | Foerster | 74—759 |
| 3,103,832 | 9/1963 | Foerster | 74—759 |
| 2,531,996 | 11/1950 | Voytech | 74—759 X |
| 2,813,437 | 11/1957 | Kelbel et al. | 74—759 |
| 2,827,805 | 3/1958 | Miller | 74—769 X |
| 2,856,795 | 10/1958 | Simpson | 74—759 X |
| 3,033,327 | 5/1962 | Kelley | 74—759 X |
| 3,056,313 | 10/1962 | Lindsay | 74—759 X |
| 3,339,431 | 9/1967 | Croswhite et al. | 74—759 X |

FOREIGN PATENTS 721,668 1/1955 Great Britain.

ARTHUR T. McKEON, Primary Examiner

U.S. Cl. X.R.

74—763, 767